(12) United States Patent
Millet et al.

(10) Patent No.: US 8,418,443 B2
(45) Date of Patent: Apr. 16, 2013

(54) METHOD OF TREATING POLLUTANTS CONTAINED IN EXHAUST GASES, NOTABLY OF AN INTERNAL-COMBUSTION ENGINE, AND SYSTEM USING SAME

(75) Inventors: Claire-Noëlle Millet, Irigny (FR); Thierry Colliou, Les Cotes d'arey (FR); Brigitte Martin, St. Genis Laval (FR)

(73) Assignee: IFP Energies Nouvelles, Cedex (FR)

( * ) Notice: Subject to any disclaimer, the term of this patent is extended or adjusted under 35 U.S.C. 154(b) by 354 days.

(21) Appl. No.: 12/965,084

(22) Filed: Dec. 10, 2010

(65) Prior Publication Data

US 2011/0138780 A1 Jun. 16, 2011

(30) Foreign Application Priority Data

Nov. 12, 2009 (FR) ..................................... 09 06015

(51) Int. Cl.
*F01N 3/00* (2006.01)
(52) U.S. Cl.
USPC .................... 60/286; 60/295; 60/299; 60/301
(58) Field of Classification Search ............. 60/274–324
See application file for complete search history.

(56) References Cited

U.S. PATENT DOCUMENTS

| 4,927,612 | A | * | 5/1990 | Bowers | 423/235 |
| 5,286,467 | A | * | 2/1994 | Sun et al. | 423/239.1 |
| 6,739,125 | B1 | * | 5/2004 | Mulligan | 60/286 |
| 6,837,041 | B2 | * | 1/2005 | Hernier | 60/286 |
| 7,220,395 | B2 | * | 5/2007 | Cooper et al. | 423/235 |
| 7,390,471 | B2 | * | 6/2008 | Sobolevskiy et al. | 423/237 |
| 2012/0117947 | A1 | * | 5/2012 | Gonze et al. | 60/274 |

FOREIGN PATENT DOCUMENTS

| EP | 1 479 652 A1 | 11/2004 |
| WO | WO 98/42623 | 10/1998 |
| WO | WO 2007/049042 A1 | 5/2007 |

\* cited by examiner

*Primary Examiner* — Thomas Denion
*Assistant Examiner* — Jesse Bogue
(74) *Attorney, Agent, or Firm* — Antonelli, Terry, Stout & Kraus, LLP.

(57) ABSTRACT

The present invention relates to a method of treating exhaust gas pollutants, notably of an internal-combustion engine, with a system comprising an exhaust line (L) with selective catalytic reduction catalysis means (62) and injection means (82) for injecting a reducing agent into the line so as to treat the pollutants, characterized in that it consists in:

heating an organonitrogen compound so as to decompose it into a mixture of at least an ammonia-containing reducing agent in the gas phase, another reducing agent in the gas phase and steam, compressing, then cooling this mixture so as to condense the steam to a liquid water phase and to obtain a gas phase of one of the two reducing agents and a liquid phase of the other reducing agent, injecting one of the reducing agents into the exhaust line in combination with said catalysis means (62) in order to treat the pollutants of these gases.

15 Claims, 1 Drawing Sheet

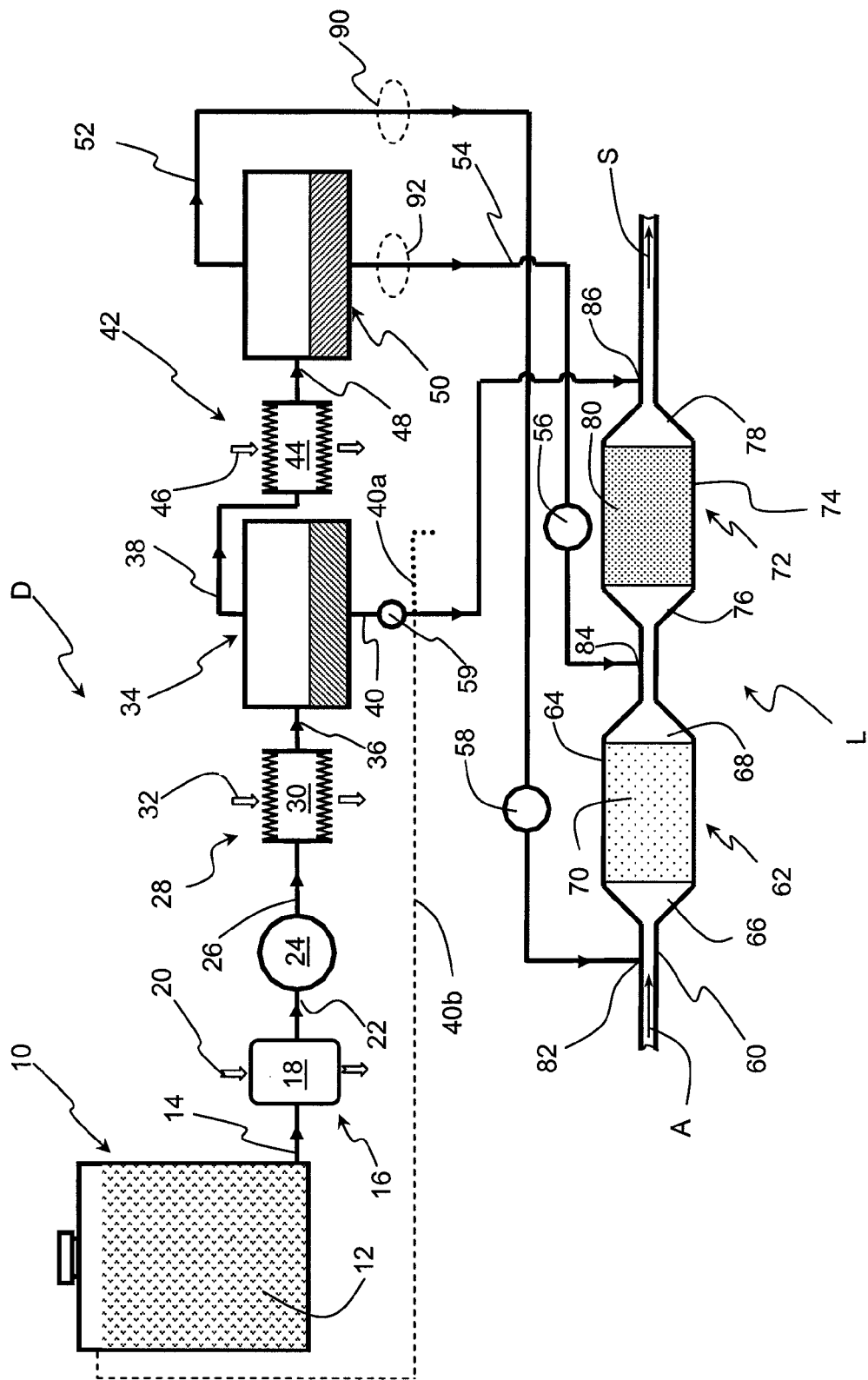

METHOD OF TREATING POLLUTANTS CONTAINED IN EXHAUST GASES, NOTABLY OF AN INTERNAL-COMBUSTION ENGINE, AND SYSTEM USING SAME

FIELD OF THE INVENTION

The present invention relates to a method intended for depollution treatment of exhaust gases, notably of an internal-combustion engine in a motor vehicle.

It more particularly concerns a method of treating pollutants contained in the exhaust gases of an auto-ignition internal-combustion engine, notably of Diesel type, but it excludes in no way such a method for spark-ignition engines, such as those running on a gaseous fuel or gasoline, and in particular with a lean mixture.

It also relates to an exhaust gas depollution treatment system using this method.

BACKGROUND OF THE INVENTION

As it is well known, the exhaust gases of these engines contain many pollutants, such as unburnt hydrocarbons, carbon monoxide, nitrogen oxides (NO and NO2), more commonly referred to as NOx, for engines running on gasoline or gas, and additionally particles for Diesel type engines.

In order to comply with emission standards and to preserve the environment, these pollutants have to be treated prior to discharging the exhaust gases into the atmosphere.

As it is generally known, this is achieved by means of a system for treating the exhaust gas circulating in the exhaust line of the engine.

Thus, catalysis means, more commonly referred to as oxidation catalysts, allow to oxidize the unburnt hydrocarbons and the carbon monoxide for engines running with a lean mixture.

For a Diesel engine exhaust line, a particulate filter can be arranged on this line in order to retain the particulates present in the exhaust gas and thus to prevent them from being discharged into the atmosphere.

This filter, which can also be a catalyzed filter, has to be periodically regenerated in order to keep all its filtration capacities. The regeneration operations mainly consist in increasing the temperature of the filter, generally by increasing the richness of the exhaust gases flowing therethrough. The higher temperature that is obtained allows to carry out combustion of the particulate matter retained in this filter.

Furthermore, in order to allow NOx treatment, the exhaust gases also flow through other catalysis means, notably SCR (Selective Catalytic Reduction) catalyst type catalysts. This SCR catalyst allows to selectively reduce the NOx to nitrogen through the action of a reducing agent.

This agent, generally injected upstream from the SCR catalyst, can be ammonia or a compound generating ammonia through decomposition, such as urea, or a hydrocarbon from a hydrocarbon-containing substance.

This reducing agent mixes with the exhaust gases, then it reacts with the NOx of the exhaust gases on the SCR catalyst according to several possible chemical reactions such as, for example:

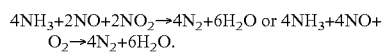

$$4NH_3 + 2NO + 2NO_2 \rightarrow 4N_2 + 6H_2O \text{ or } 4NH_3 + 4NO + O_2 \rightarrow 4N_2 + 6H_2O.$$

The precursor of the reducing agent conventionally used for this application has to be stored in a large volume, whereas the space available in the vehicle is limited. A large volume is necessary because this precursor is stored in liquid form and diluted in water.

Besides, SCR catalysts, which use ammonia as the NOx reducing agent, are generally active only above a light-off temperature ranging between 180° C. and 250° C. depending on the nature of the catalyst. Below this temperature, and in particular upon cold start of the vehicle, the NOx are not treated by ammonia-based SCR catalysts.

The present invention allows to overcome the aforementioned drawbacks by using a compound of high density or stored in solid form. This allows the compound to be arranged in the vehicle with a restricted volume.

SUMMARY OF THE INVENTION

The present invention thus relates to a method of treating pollutants contained in exhaust gases, notably of an internal-combustion engine, with a system comprising an exhaust line with selective catalytic reduction catalysis means traversed by said gases and injection means for injecting a reducing agent into said line so as to treat said pollutants as they flow through said catalysis means, characterized in that it consists in:

heating an organonitrogen compound so as to decompose it into a mixture of at least an ammonia-containing reducing agent in the gas phase, another reducing agent in the gas phase and steam, compressing, then cooling this mixture so as to condense the steam to a liquid water phase and to obtain a gas phase of one of the two reducing agents and a liquid phase of the other reducing agent, injecting one of the reducing agents into the exhaust line in combination with at least said catalysis means in order to treat the pollutants of these gases.

The method can consist in placing additional catalysis means on the exhaust line and in injecting the other reducing agent in combination with said additional catalysis means so as to treat the pollutants of the exhaust gases.

The method can consist in injecting water in the liquid phase into the exhaust line.

The method can consist in using water in the liquid phase to prepare an aqueous compound solution.

The method can consist in discharging the water in the liquid phase to the outside.

The method can consist in cooling, by first cooling means, the mixture so as to obtain a gas phase of two reducing agents and a liquid water phase, then in cooling, by second cooling means, the gas phase of two reducing agents so as to obtain a reducing agent in the gas phase and another reducing agent in the liquid phase.

The method can consist in heating the organonitrogen compound so as to obtain its decomposition into a mixture of at least a reducing agent containing ammonia and another reducing agent containing a hydrocarbon substance.

The invention also relates to a system for treating pollutants contained in the exhaust gases of an internal-combustion engine, comprising an exhaust line with selective catalytic reduction catalysis means traversed by said gases and means for injecting a reducing agent into said line so as to treat said pollutants upon passage thereof through said catalysis means, characterized in that it comprises a reducing agent production device with means for heating an organonitrogen compound so as to obtain a mixture of at least two reducing agents in the gas phase, one containing ammonia and steam.

The system can comprise additional catalysis means associated with means for injecting one of the reducing agents.

The other reducing agent in the gas phase can comprise a hydrocarbon substance.

The system can comprise means for cooling the mixture of the two reducing agents in the gas phase and the steam, allowing to obtain a liquid water phase and a liquid phase of at least one of the reducing agents.

The organonitrogen compound can comprise a compound that can decompose into ammonia and at least a hydrocarbon substance.

The organonitrogen compound can advantageously comprise hexamethylene-tetramine.

The organonitrogen compound can comprise an ammonium salt with an ammonium acetate.

BRIEF DESCRIPTION OF THE DRAWING

Other features and advantages of the invention will be clear from reading the description hereafter, given by way of non limitative example, with reference to the accompanying sole FIGURE that shows the system according to the invention.

DETAILED DESCRIPTION

This exhaust gas depollution treatment system comprises a device D for producing at least two reducing agents and an exhaust line L associated therewith.

The device comprises a storage vessel 10 containing a basic compound 12, preferably in aqueous solution, having the specific feature of decomposing into ammonia and a hydrocarbon substance, more particularly a hydrocarbon, either by hydrolysis or under the effect of heat.

By way of example, this basic compound can be an organonitrogen compound. Separation of the compounds (such as ammonia and hydrocarbon) obtained by hydrolysis or thermolysis can be achieved through a series of condensations.

This compound can be hexamethylenetetramine (in short HMT, more commonly known as urotropine) or an ammonium salt such as ammonium acetate. These compounds can be advantageously stored in solid form. This allows to significantly reduce the size of the vessel and/or to increase the amount of compound transported.

This vessel is connected by a line 14 to means 16 for heating the basic compound coming from this vessel.

Advantageously, these heating means consist of a heat exchanger 18 traversed, on the one hand, by this compound and, on the other hand, by a heat source 20, here the exhaust gases 20 of the engine, which transmits the heat it contains to this compound.

Other types of heat source or of heating means commonly known can be considered, such as the engine coolant of the vehicle, the lubricant of this engine, burners, electric resistance heaters, . . . .

This exchanger is connected by another line 22 to a compressor 24 of the heated compound. This compressor is connected by a line 26 to one of the first means 28 for cooling the hot compressed compound.

These first cooling means comprise, by way of example, a cooler 30 in form of an exchanger traversed by the hot compressed compound from line 26 and by a cooling fluid such as outdoor fresh air 32.

A closed tank 34 forming first storage and separation means for the cooled compound is connected to this cooler by a line 36. This tank comprises two outlet lines 38, 40. An outlet line 38 for a fluid in gas form, referred to as gas outlet line, starts in the upper part of this tank and another outlet line 40 for a fluid in the liquid state, referred to as aqueous liquid outlet line, starts in the bottom of this tank.

Gas outlet line 38 leads to second cooling means 42 that are advantageously similar to the first means with another cooler 44 swept by a cooling fluid 46, here also outdoor air.

This cooler is in turn connected by a line 48 to a closed receptacle 50 forming second storage and separation means, which also comprises two outlet lines, a gaseous fluid outlet line 52 located in the upper part of the receptacle and a liquid fluid outlet line 54 located in the lower part of this receptacle.

Preferably, the two outlet lines 52 and 54 of this receptacle are each provided with fluid circulation control means, here a liquid metering pump 56 arranged on line 52 and a gas metering pump 58 arranged on line 54.

Similarly, aqueous liquid outlet line 40 of tank 34 comprises a fluid circulation control means that can come in form of a cock, a valve, a metering pump, . . . .

In the example illustrated in the FIGURE, device D belongs to a system intended for depollution treatment of exhaust gases circulating in an exhaust line L, between an inlet for a gas (arrow A) resulting from the combustion of a fuel mixture of an internal-combustion engine and an outlet (arrow S) for discharge to the atmosphere.

This exhaust line comprises an exhaust tube 60 housing an SCR catalyst 62 using ammonia as the reducing agent.

This SCR catalyst comprises a tubular casing 64 with an inlet box 66 for the exhaust gases coming from the engine and a treated gas outlet box 68 connected to the exhaust tube for discharge of the depolluted exhaust gases to the atmosphere (arrow S).

Casing 64 contains a filter support 70 arranged between the inlet and outlet boxes. This body, preferably monolithic, comprises a support wherein one or more catalytic reactants are set so as to act upon the NOx of these exhaust gases.

Preferably, an additional SCR catalyst 72 is arranged on this tube 60 between SCR catalyst 62 and the exhaust gas outlet (arrow S). This additional catalyst preferably comprises a tubular casing 74, an inlet box 76 connected by a portion of exhaust tube 60 to outlet box 68 of first SCR catalyst 62 and an outlet box 78 connected to this exhaust tube for discharge of the depolluted exhaust gases to the atmosphere (arrow S).

Casing 74 also comprises a filter support 80, preferably monolithic, which is chemically active so as to act upon the NOx of the exhaust gases coming from SCR catalyst 62.

Advantageously, this additional catalyst has the particular feature of acting upon the NOx by using a hydrocarbon substance as the reducing agent.

Alternatively, this additional SCR catalyst can be replaced by a particulate filter or a catalyzed particulate filter comprising a filter support impregnated with one or more catalytic reactants so as to act upon the NOx and/or on the exotherm of this filter. In this case, the hydrocarbon substance is used to reduce the NOx stored in the catalyzed particulate filter and/or to generate the exotherm required for combustion of the particulate matter present in this filter.

In the rest of the description below, by way of example only, we consider an exhaust line L with, between the exhaust gas inlet (arrow A) and the exhaust gas outlet (arrow S), and in this order, an SCR catalyst 62, referred to as main catalyst, and an additional SCR catalyst 72.

As illustrated in the sole FIGURE, outlet line 52 carrying the gaseous fluid out of receptacle 50 ends at an injection point 82 for the ammonia-containing reducing agent in the portion of exhaust tube 60 located upstream from inlet box 66 of main catalyst 62, thus forming injection means for the ammonia-containing reducing agent. In order to form means for feeding the hydrocarbon-based reducing agent into the exhaust line, liquid fluid outlet line 54 ends at a branch connection 84 of exhaust tube 60. This branch connection is arranged between main catalyst outlet box 68 and additional catalyst inlet box 76. Aqueous liquid outlet line 40 ends at a connection pipe 86 arranged downstream from the additional catalyst, between its outlet box 78 and the exhaust gas outlet (arrow S), so as to form intake means for this liquid in this line.

Without departing from the scope of the invention, the aforementioned lines can end into the boxes corresponding thereto. Thus, liquid fluid outlet line 52 can end into inlet box 66 of main catalyst 62, gaseous fluid outlet line 54 can end into inlet box 76 of additional catalyst 72 and aqueous liquid outlet line 40 can end into outlet box 78 of this additional catalyst.

The outlet of aqueous liquid outlet line 40 may also be free, as illustrated in dotted line (40a) in the FIGURE, so as to discharge the liquid concerned to the outside, or connected to vessel 10 (40b) so as to mix with the compound it contains.

The description is now continued on the basis of an example wherein compound 12 contained in vessel 10 is an aqueous hexamethylenetetramine (HMT) solution ($C_6H_{12}N_4+H_2O$).

The HMT is initially in the solid phase, preferably in form of small pellets (approximately ten mm), so as to be easily stored. This HMT can thus be mixed with water in order to obtain the aqueous solution that is then fed into vessel 10.

An alternative consists in dissolving the pellets in water only as and when needed, which affords the advantage of decreasing the storage volumes.

The water required for this dissolution can come from the device itself, as explained below.

This solution is first heated to a minimum temperature close to 260° C., and preferably to a temperature below the cracking or reaction temperature of hydrocarbon substances by flowing through exchanger 18 while undergoing hydrolysis.

The mixture obtained contains ammonia ($NH_3$) and formaldehyde ($H_2CO$) gas phases associated with steam. The mixture obtained is then sent to compressor 24 through line 22 in order to be compressed. Preferably, this compression ranges between 4 and 10 bars.

The compressed mixture is then cooled by passing through cooler 30 at a temperature ranging from about 150° C. to about 180° C. depending on the pressure of the mixture. Cooling has the effect of condensing the steam and of feeding into tank 34, through line 36, a mixture of two phases with a gas phase comprising a mixture of ammonia and of formaldehyde ($NH_3+H_2CO$) and a liquid phase with water ($H_2O$).

In tank 34, the two phases separate and the water contained in the bottom of this tank is discharged through aqueous liquid outlet line 40. This water is then sent to either the exhaust tube through connection pipe 86, or to the outside through free liquid outlet line 40a, or fed through line 40b into vessel 10 in order to dissolve at least part of the HMT pellets contained therein so as to obtain a desired aqueous solution. Fluid circulation control means 59 allows to stop the water circulation in the line when the level is insufficient in tank 34 and/or to control the amount of water sent to vessel 10 so as to obtain the desired amount of aqueous HMT solution.

Of course, in the latter case and even if the water from the decomposition is recovered, a sufficient volume of water is first provided in tank 34 to dissolve the HMT contained in the vessel.

Fluid circulation control means 59 can also be designed in such a way that it allows to send the water to the exhaust tube through connection pipe 86 and/or to the outside through free liquid outlet line 40a and/or to feed it into vessel 10 through line 40b.

The gaseous mixture contained in the top of this tank is discharged through gas outlet line 38 to second cooler 44 through which it flows so as to be cooled to around ambient temperature.

Cooling allows to condense the hydrocarbon vapour phase to a liquid phase.

At the outlet of this cooler, line 48 carries towards receptacle 50 a mixture of two phases, a hydrocarbon liquid phase (formaldehyde $H_2CO$) resulting from cooling in cooler 44, and an ammonia gas phase ($NH_3$). These two phases are separated in this receptacle into a hydrocarbon liquid phase in the bottom and an ammonia gas phase in the upper part thereof.

The gaseous ammonia is injected through gaseous fluid outlet line 52 into the exhaust line at point 82 upstream from catalyst 62 when the liquid metering pump 58 is actuated, notably under the effect of control means such as the calculator of the vehicle.

This ammonia thus mixes with the hot exhaust gases. The mixture thus formed reacts with the NOx of the exhaust gases when flowing through the main SCR catalyst, thus providing NOx depollution treatment.

Similarly, when gas metering pump 56 is in operation, the liquid hydrocarbon is sent through liquid fluid line 54 to the exhaust line upstream from additional catalyst 72 through branch connection 84.

The hydrocarbon injected into tube 60 vaporizes on contact with the exhaust gases coming from the main SCR catalyst. This vaporized hydrocarbon mixes with the exhaust gases by reacting with the NOx that have not been reduced when flowing through the additional SCR catalyst. This therefore allows to finalize the NOx depollution treatment.

The ammonia gas phase and/or the hydrocarbon liquid phase can optionally be stored in accumulators, respectively a gas accumulator 90 and a liquid accumulator 92 for subsequent use when one and/or the other of the metering pumps is not active in relation with the engine running conditions.

It is possible to substitute for additional SCR catalyst 72 an oxidizing catalyzed particulate filter that also reacts to the hydrocarbon reducing agent from liquid outlet line 54.

In this case, the hydrocarbon is oxidized by the catalyst. This reaction generates an exotherm that is used to initiate the combustion of the particles trapped in the filter.

It can be noted that the two catalysts can be used according to a strategy, generally for engine cold start, wherein only conventional SCR catalyst 72 is used with the hydrocarbon from outlet line 54 when the exhaust gas temperature is insufficient to make main SCR catalyst 62 operative. As soon as the temperature of these gases is sufficient (of the order of 200° C.), main SCR catalyst 62 is active by reacting with the ammonia delivered by outlet line 52 and additional SCR catalyst 72 can be made inoperative by deactivating gas metering pump 56.

Of course, compressor 24, metering pumps 56, 58 and control means 59 are controlled by any means such as the engine calculator, so as to be actuated according to the various depollution strategies contained in the charts of this calculator.

The present invention is not limited to the example described and it encompasses any variant or equivalent covered by the present invention.

Notably, one may consider using another type of compound in vessel 10, which results in obtaining in receptacle 50 the ammonia in liquid form and another reducing agent in gas form.

In this case, liquid outlet line 54 ends at injection point 82 and gas outlet line 52 ends at branch connection 84.

The invention claimed is:

1. A method of treating pollutants contained in exhaust gases, notably of an internal-combustion engine, with a system comprising an exhaust line with selective catalytic reduction catalysis means traversed by said gases and injection means for injecting a reducing agent into said line so as to treat said pollutants as they flow through said catalysis means, characterized in that it consists in:
heating an organonitrogen compound so as to decompose it into a mixture of at least an ammonia-containing reducing agent in the gas phase, another reducing agent in the gas phase and steam,
compressing, then cooling this mixture so as to condense the steam to a liquid water phase and to obtain a gas phase of one of the two reducing agents and a liquid phase of the other reducing agent,
injecting one of the reducing agents into the exhaust line in combination with at least said catalysis means in order to treat the pollutants of these gases.

2. A pollutant treatment method as claimed in claim 1, characterized in that it consists in placing additional catalysis means on the exhaust line and in injecting the other reducing agent in combination with said additional catalysis means so as to treat the pollutants of the exhaust gases.

3. A pollutant treatment method as claimed in claim 1, characterized in that it consists in injecting the water in the liquid phase into the exhaust line.

4. A pollutant treatment method as claimed in claim 1, characterized in that it consists in using the water in the liquid phase to prepare an aqueous compound solution.

5. A pollutant treatment method as claimed in claim 1, characterized in that it consists in discharging the water in the liquid phase to the outside.

6. A pollutant treatment method as claimed in claim 1, characterized in that it consists in cooling, by first cooling means, the mixture so as to obtain a gas phase of two reducing agents and a liquid water phase, then in cooling, by second cooling means, the gas phase of two reducing agents so as to obtain a reducing agent in the gas phase and another reducing agent in the liquid phase.

7. A pollutant treatment method as claimed in claim 1, characterized in that it consists in heating the organonitrogen compound so as to obtain its decomposition into a mixture of at least a reducing agent containing ammonia and another reducing agent containing a hydrocarbon substance.

8. A system for treating pollutants contained in the exhaust gases of an internal-combustion engine, comprising an exhaust line with selective catalytic reduction catalysis means traversed by said gases and injection means for injecting a reducing agent into said line so as to treat said pollutants upon passage thereof through said catalysis means, characterized in that it comprises a reducing agent production device with means for heating an organonitrogen compound so as to obtain a mixture of at least two reducing agents in the gas phase, one containing ammonia and steam.

9. A pollutant treatment system as claimed in claim 8, characterized in that it also comprises additional catalysis means associated with injection means for injecting one of the reducing agents.

10. A pollutant treatment system as claimed in claim 8, characterized in that the other one of the two reducing agents in the gas phase comprises a hydrocarbon substance.

11. A pollutant treatment system as claimed in claim 8, characterized in that the device comprises means for cooling the mixture of the two reducing agents in the gas phase and the steam, allowing to obtain a liquid water phase and a liquid phase of at least one of the reducing agents.

12. A pollutant treatment system as claimed in claim 8, characterized in that the organonitrogen compound comprises a compound that can decompose into ammonia and at least a hydrocarbon substance.

13. A pollutant treatment system as claimed in claim 8, characterized in that the organonitrogen compound comprises hexamethylenetetramine ($C_6H_{12}N_4$).

14. A pollutant treatment system as claimed in claim 8, characterized in that the organonitrogen compound comprises an ammonium salt.

15. A pollutant treatment system as claimed in claim 14, characterized in that the ammonium salt comprises an ammonium acetate.

* * * * *